United States Patent [19]
Dyche et al.

[11] Patent Number: 6,147,628
[45] Date of Patent: Nov. 14, 2000

[54] EFFICIENT DATA CONVERSION OF LIST OF STRINGS

[75] Inventors: Mark Dyche, Winchester; Andrew Hickson, West Wellow, both of United Kingdom

[73] Assignee: International Business Machines Corporation, Armonk, N.Y.

[21] Appl. No.: 09/236,180

[22] Filed: Jan. 25, 1999

[30] Foreign Application Priority Data

Oct. 22, 1998 [GB] United Kingdom .................. 9823007

[51] Int. Cl.[7] .................................................. H03M 7/00
[52] U.S. Cl. ............................................................ 341/60
[58] Field of Search ................................ 341/69, 67, 55, 341/51, 106; 707/6, 7

[56] References Cited

U.S. PATENT DOCUMENTS

| | | | |
|---|---|---|---|
| 4,433,327 | 2/1984 | Vallet et al. | 340/347 |
| 5,309,358 | 5/1994 | Andrews et al. | 364/419 |
| 5,389,924 | 2/1995 | Ogawa | 341/106 |
| 5,426,779 | 6/1995 | Chambers | 707/6 |
| 5,793,381 | 8/1998 | Edberg | 345/467 |

*Primary Examiner*—Brian Young
*Attorney, Agent, or Firm*—Jay P. Sbrollini

[57] ABSTRACT

A method of converting a plurality of strings stored in an input buffer to a plurality of evenly spaced strings in an output buffer involves first passing over the input buffer and, for each string, placing the string in the output buffer at a next available address. If the string length is longer than a maximum string length, the maximum string length is set to the string length and the string is set as the last incorrectly placed string in the output buffer. The next available address in the output buffer is incremented by the maximum string length plus the product of any positive difference between the current string length and previous maximum string length and the number of strings already placed in the output buffer. A second pass over said output buffer from the last incorrectly placed string in a direction opposite the first passing step moves each string within the output buffer to an address being a multiple of the maximum string length from the start of the output buffer.

6 Claims, 1 Drawing Sheet

EFFICIENT DATA CONVERSION OF LIST OF STRINGS

FIELD OF THE INVENTION

The present invention relates to a component and method for converting strings which may change length during conversion.

BACKGROUND OF THE INVENTION

During conversion between different encodings of character data, especially for Asian character sets, (examples include UNICODE (2 bytes per character), ASCII (1 or 2 bytes per character), EBCDIC (1 or 2 bytes per character plus shift characters added between Latin and Asian characters), the number of bytes in a character string can change. In the MQSeries family of products produced by IBM, in common with many other systems for handling data, there is a structure comprising a list of strings, each string in the list being the same size. The MQSeries structure known as a PCF (Programmable Command Format) string list is a list of MQSeries objects such as queues, queue managers typically used for passing information from one MQSeries machine to another.

There is often a requirement to convert the strings from one format to another. This can result in changes to the lengths of the converted strings which must be subsequently padded so the converted strings all have the same length to make them more easily accessible.

Accordingly, the present invention provides a method in a computer system comprising an input buffer and an output buffer, a method of converting a plurality of strings stored in said input buffer to a plurality of evenly spaced strings in said output buffer comprising the steps of: first passing over said input buffer and, for each string having a string length in said input buffer: placing the string in said output buffer at a next available address, responsive to said string length being longer than a maximum string length, setting said maximum string length to said string length and setting said string as the last incorrectly placed string in the output buffer, incrementing the next available address in the output buffer by the maximum string length plus the product of any positive difference between the current string length and previous maximum string length and the number of strings already placed in the output buffer; and second passing over said output buffer from the last incorrectly placed string in a direction opposite said first passing step and, for each incorrectly placed string in said output buffer: moving the string within the output buffer to an address being a multiple of said maximum string length from the start of the output buffer, and a component cooperable with an input buffer and an output buffer in a computer system for converting a plurality of strings stored in said input buffer to a plurality of evenly spaced strings in said output buffer, comprising: means for first passing over said input buffer including: placing each string having a string length in said input buffer into said output buffer at a next available address, means, responsive to a string length being longer than a maximum string length, for setting said maximum string length to said string length and setting said string as the last incorrectly placed string in the output buffer, means for incrementing the next available address in the output buffer by the maximum string length plus the product of any positive difference between the current string length and previous maximum string length and the number of strings already placed in the output buffer; and means for second passing over said output buffer from the last incorrectly placed string in a direction opposite said first passing means including: means for moving each incorrectly placed string in said output buffer to an address being a multiple of said maximum string length from the start of the output buffer.

The present invention only requires one output buffer, two passes of the data and minimises the amount of data movement by making use of the best information available at any given time during conversion. The invention operates by predicting where each string should be placed in the output buffer based on the longest string found up to the point a string is encountered.

BRIEF DESCRIPTION OF THE DRAWINGS

An embodiment of the invention will now be described with reference to the accompanying drawings, in which.

DESCRIPTION OF THE PREFERRED EMBODIMENTS

The present invention will be described in terms of a preferred embodiment implemented for MQSeries, although it will be seen that the invention is not limited to this system. On MQSeries, a string list structure has "count" strings each of length "length". The structure is defined as follows in C:

```
struct{ int  length;
        int  count;
        char data[length * count]
      } string_list;
```

When this is converted, say from ASCII to EBCDIC, and the data includes multi-byte characters (MBCS) the lengths of the converted strings may change, where each string may expand or contract. This is allowed by padding any short strings to the length of the longest, and changing the length field.

The present invention makes the conversion from a source (input) buffer into an output buffer without using an intermediate buffer (as this could be quite long), and makes the conversion with an optimum number of data moves.

Figure 1:
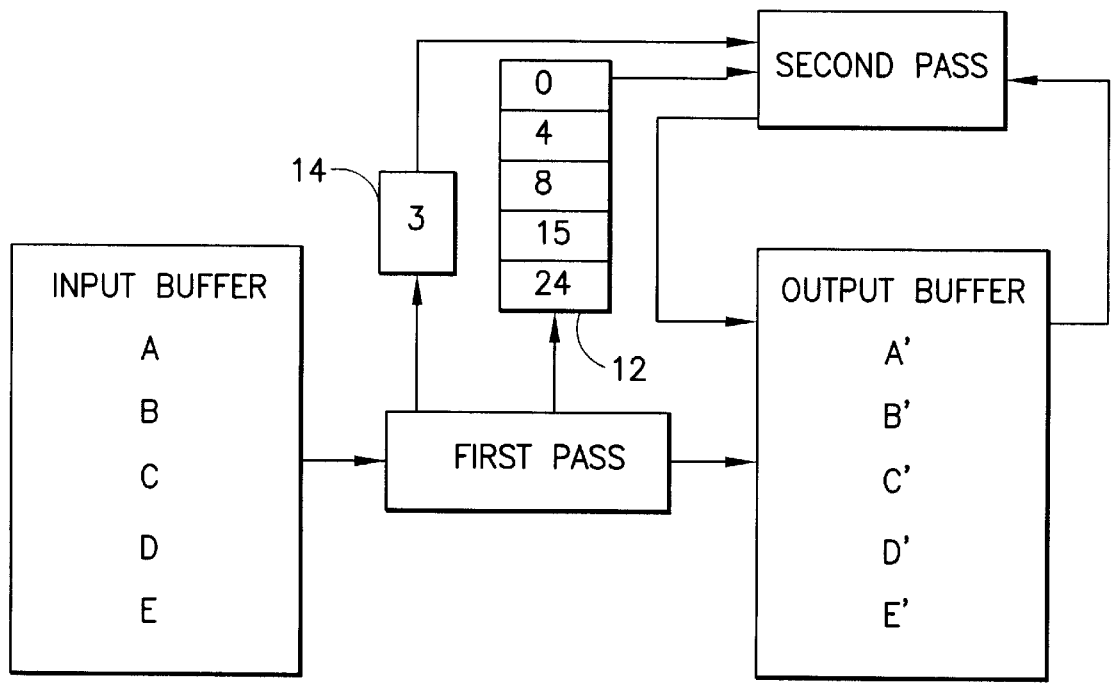
FIG. 1 is a schematic diagram illustrating the movement of information using the method according to the invention.

This is done by making a first pass through the data in the source buffer, converting each string and remembering the size. The output string is placed in the output buffer in the position it would take based on the current value of longest string found so far. This position is remembered in an array 12, FIG. 1. The next available address in the output buffer is incremented by the longest string length plus the product of any positive difference between the current string length and previous maximum string length and the number of strings already placed in the output buffer. The objective of this is that, when the maximum length has been found, all strings converted after this point will be in the correct place and will not need moving. A note is taken of the last string which is in the incorrect position and this is stored in location 14.

The space which would remain in the output buffer if all the converted strings are padded to the longest string found so far is also calculated. This buffer amount is used to ensure that there is space in which to convert the next string. If the current string is longer than any previous string this calculation is repeated, as there may not be space to pad all the previous strings to this length. If there is not enough space, the conversion is stopped and a truncation warning is preferably returned. When the first pass is complete, a test is made to see if all the strings converted are the same length, if so, then no padding is required. If the strings are not all the same length, then a second padding pass is required. This works backwards, moving each string to its final place and padding to the maximum length.

Preferably, a memory move instruction which can cope with overlapped strings is used. This ensures padding is safe as all moves are toward the end of the output buffer.

It should also be seen that as the length of converted strings is not known before conversion, special case logic should be applied to the last string if this is, or could be, truncated.

The overall effect of the first pass is that all the strings are processed, converting them while scanning from left to right, and always moving them into a position to the right. The second correction pass starts on the rightmost string which is in error, and processes all the strings, working from right to left, but again, only moving them to the right. It will be seen that while the terms left and right are used for simplicity in relation to FIGS. 2 and 3, they simply indicate the order in which respective memory addresses within the input and output buffers are accessed.

To explain the invention further, let us take an example, which assumes the output buffer is large enough, so truncation does not occur.

Suppose we have 5 strings labelled A, B, C, D and E. After conversion these vary in length, say to lengths 4, 3, 5, 6, and 6 bytes. we have used the term "bytes" here for simplicity, but it will be seen that this can be any suitable unit of memory.

Figure 2:
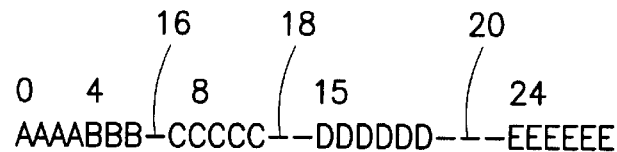
FIG. 2 shows information in the output buffer of FIG. 1 after a first pass.

After the first pass the buffer is arranged as shown in FIG. 2 where the numbers in the first row are byte positions. The string A is four bytes long, and so the string B which is three bytes long is placed at position 4 and padded by one byte (16) as the string B is one less than the current maximum string length. Because the string B is shorter than A and suitably padded, both strings are both considered to be in the correct position and so the location 14 storing an identifier for the last incorrect string is set to null. String C is 5 bytes long, one longer than the previous maximum. The buffer thus needs to be padded by two bytes (18), as the two strings previously placed in the output buffer were one byte shorter than the new maximum length. String C is also incorrectly placed and an identifier for C is thus stored in location 14. String D is 6 bytes long, again one longer than the previous maximum over the last three strings, and so the buffer needs to be padded by three bytes (20). Location 14 is again updated to indicate string D is the last incorrectly placed string. String E is six bytes long and so is correctly placed as would any last string once it is suitably padded to the maximum length.

Figure 3:
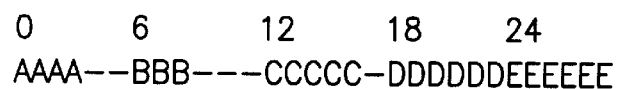
FIG. 3 shows information in the output buffer of FIG. 1 after a second pass.

String D is the last string misplaced, so the second pass will start here and the final result is shown in FIG. 3. Each previous incorrect string, except the first string which, like the last string, is always correct, is moved to the right to an address corresponding the next free multiple of the maximum string length. Thus, string D which was at address 15 is moved to 18, string C is moved from address 8 to 12, and string B from address 4 to 6.

It will therefore be seen that the invention enables the conversion of strings with only one output buffer, two passes and the minimal amount of data movement.

It will be seen that while the embodiment operates on an input array of strings of equal length, this is not a necessary requirement for the invention. Rather the invention is employed to produce an output buffer populated with a plurality of evenly spaced strings.

The term conversion has been described in terms of transforming strings in one format to strings in another format. It will be seem, however, that any processing of the strings between the input buffer and the output buffer falls within the scope of the invention. In this regard the term string should not necessarily be limited to printable characters, rather any non-atomic data type.

It should also be seen that while the invention has been described in terms of a component operable within MQSeries, it may be implemented in any number of ways. For example, a method could be implemented as an operating system command with a set of suitable parameters. This in turn could be tied closer to hardware to make its operation more efficient and faster.

What is claimed is:

1. In a computer system comprising an input buffer and an output buffer, a method of converting a plurality of strings stored in said input buffer to a plurality of evenly spaced strings in said output buffer comprising the steps of:

first passing over said input buffer and, for each string having a string length in said input buffer:

placing the string in said output buffer at a next available address, responsive to said string length being longer than a maximum string length, setting said maximum string length to said string length and setting said string as the last incorrectly placed string in the output buffer, incrementing the next available address in the output buffer by the maximum string length plus the product of any positive difference between the current string length and previous maximum string length and the number of strings already placed in the output buffer; and second passing over said output buffer from the last incorrectly placed string in a direction opposite said first passing step and, for each incorrectly placed string in said output buffer:

moving the string within the output buffer to an address being a multiple of said maximum string length from the start of the output buffer.

2. A method as claimed in claim 1 wherein said placing step includes recording the address of each string placed in the output buffer in an array and said moving step comprises locating the address of the next incorrectly placed string in said array before moving the string.

3. A method as claimed in claim 1 wherein said placing step includes converting a string stored in a first format in said input buffer to a second format for storage in said second buffer.

4. A method as claimed in claim 3 wherein said formats are respective ones of a group of UNICODE, ASCII, extended ASCII and EBCDIC.

5. A component cooperable with an input buffer and an output buffer in a computer system for converting a plurality of strings stored in said input buffer to a plurality of evenly spaced strings in said output buffer, comprising:

means for first passing over said input buffer including:

placing each string having a string length in said input buffer into said output buffer at a next available address, means, responsive to a string length being longer than a maximum string length, for setting said maximum string length to said string length and setting said string as the last incorrectly placed string in the output buffer, means for incrementing the next available address in the output buffer by the maximum string length plus the product of any positive difference between the current string length and previous maximum string length and the number of strings already placed in the output buffer; and means for second passing over said output buffer from the last incorrectly placed string in a direction opposite said first passing means including:

means for moving each incorrectly placed string in said output buffer to an address being a multiple of said maximum string length from the start of the output buffer.

6. A computer program product comprising computer program code stored on a computer readable storage medium for, when executed on a computer, converting a plurality of strings stored in an input buffer to a plurality of evenly spaced strings in an output buffer, the product comprising a component as claimed in claim 5.

\* \* \* \* \*